Jan. 27, 1948.   T. WACHS ET AL   2,435,170
APPARATUS FOR MOLDING PLASTIC ARTICLES
Filed April 1, 1946
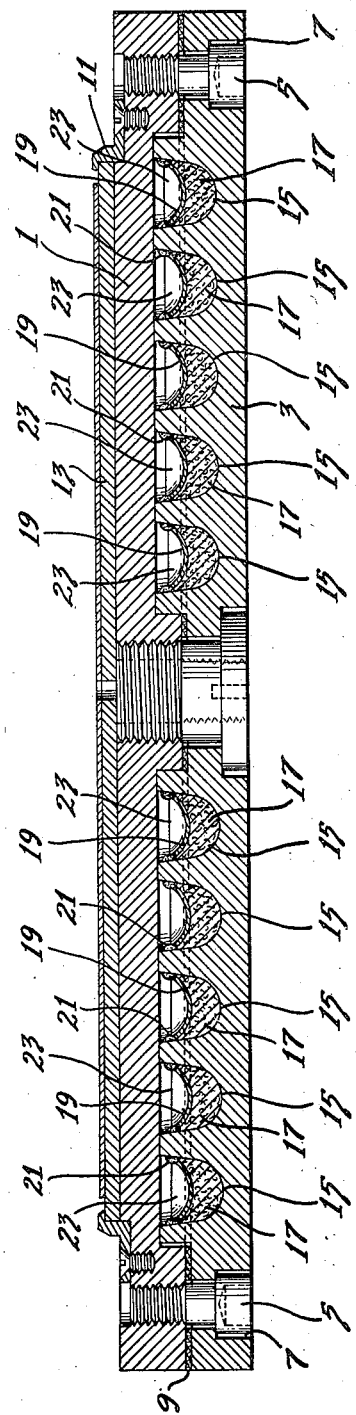
INVENTORS.
Theodore Wachs &
James M. Shutt
BY 
ATTORNEY Patented Jan. 27, 1948

UNITED STATES PATENT OFFICE 2,435,170

APPARATUS FOR MOLDING PLASTIC ARTICLES

Theodore Wachs, Bala-Cynwyd, Pa., and James M. Shutt, Haddonfield, N. J., assignors to Radio Corporation of America, a corporation of Delaware Application April 1, 1946, Serial No. 658,758

10 Claims. (Cl. 18—5.3)

This invention relates to apparatus for molding plastic articles, and more particularly to a die holder for molds useful in molding plastic articles such as phonograph records.

In the manufacture of phonograph records, the dies or matrices are mounted in presses by means of suitable supporting plates which are provided with passages for steam and cold water. A quantity of plastic material is placed between a pair of such molds and pressure is applied while steam and cold water are passed, alternately, through the aforementioned passages. The successive heating and chilling of the matrices causes the plastic material to first soften and flow over the matrix surfaces, and then to harden in desired shape. This heating and chilling should be carried on as rapidly as possible in the interest of maximum production.

The type of mold commonly used in the prior art consists, essentially, of two steel plates which are generally soldered together. Prior to soldering, the plate to which the matrix is secured is first machined out to provide a series of annular grooves which constitute the passage for the steam and cooling water. Obviously, the internal passage for the steam and water is bounded by portions of each of the plates constituting the mold, and therefore both halves of the mold are alternately heated and cooled. It is apparent, therefore, that whatever heating and cooling is imposed upon the matrix, and through it upon a record mass, must also be imposed upon the entire mold, so that the useful heating and cooling represents only a very small portion of the total. To accomplish the heating or cooling of a record, which weighs in the neighborhood of about one-half pound, requires the simultaneous heating and cooling of two large masses of steel. In conventional presses, two molds are used, one for the lower and one for the upper side of the record. In the case of a ten-inch record, the combined weight of these two molds is about 132 lbs. The very low efficiency of the heating and cooling effects will become apparent at once when it is considered that a half pound of record material is usefully treated simultaneously with the practically useless treatment of 132 lbs. of steel. It will also be obvious that the heating or cooling of this large mass of steel occupies an interval of time which detracts from the time of useful heating and cooling of the matrix, the latter being accomplished only after the steel mold itself has been completely heated or cooled. The time factor in the pressing of a record is therefore inefficiently distributed because of the large mass of the mold.

Inasmuch as it is desirable to cool the heated mold as rapidly as possible, so as to obtain an effective cooling of the record itself, cold water of the order of 62° F. has usually been found necessary. It is known, of course, that cold water is frequently difficult and nearly always expensive to provide. Thus, prior art molds have been rather expensive to operate, aside from their low efficiency for the reasons pointed out above.

A further disadvantage of prior art molds is found in the fact that the face thereof presented to the matrix becomes roughened after a period of use and must be redressed by precision grinding in order to insure good heat transfer contact with the matrix, and also to avoid destruction of the matrix. This is due very largely to the unequal heating and cooling of the two portions of the mold which are firmly secured to each other by the solder joint in order to prevent lateral shifting of the mold plates.

The primary object of our present invention is to provide an improved die holder for molds of the type specified above which will be free from the aforementioned and other disadvantages found in prior art die holders. More particularly, it is an object of our present invention to provide an improved mold for the manufacture of phonograph records which will have a much higher efficiency than molds of the prior art, with the consequent reduction in the cost of operation.

Another object of our present invention is to provide an improved mold as aforesaid by means of which the time cycle required for heating and cooling of the work will be greatly shortened.

Still another object of our present invention is to provide an improved mold as set forth above with which cooling water of considerably higher temperature may be used than has been possible heretofore with similar, prior art molds.

A further object of our present invention is to provide an improved mold as aforesaid in which the danger of distortion of the mold plates due to non-uniform temperature changes will be reduced to a minimum, whereby the probability of obtaining a distorted, finished product is greatly minimized.

It is also an object of our present invention to provide an improved mold as above set forth which is simple in construction, which can be manufactured without difficulty, and which is relatively inexpensive in cost.

In general, the construction and outward appearance of our improved mold is rather similar to those of prior art molds, but the design of the internal passage is materially different. In accordance with our present invention, the mold is made of two plates, as heretofore, but the channels or passages for the alternate flow of steam and cooling water are formed not in the front plate, or the plate to which the matrix or die is secured, but rather in the other or back plate. It will be at once apparent, therefore, that the front plate can be made considerably thinner, so that the heat passages through which the steam and cooling water flow may be made fewer in number than in the conventional molds, but preferably wider than in conventional molds, and may be cast in some suitable metal with simple machining, if found necessary. According to a further and very important feature of our present invention, each of the passages is insulated in the portion thereof remote from the front plate with a suitable insulating material such as rock wool, diatomaceous earth, suitable plastic material (preferably of the thermosetting type) and the like, the insulation being kept hermetically sealed by means of a top sheet or cover of stainless steel or other suitable, non-corrosive metal which is welded or soldered to the walls of each passage in fluid-tight relation therewith. The space remaining between this top sheet or cover and the front plate of the mold constitutes the necessary passage for steam and water and is so arranged that the heating and cooling media are alternately in direct contact with the front plate of the mold where they are most useful and effective, but are largely insulated away from the remaining or back plate of the mold into which the heat is not permitted to be dissipated to any great extent. Thus, with our improved mold, the heat is not only transferred to the matrix through the front plate with greater rapidity and greater efficiency, but when the cooling water is introduced into the passage, its useful effect upon the record is much more promptly accomplished since it passes only through the portion of the mold immediately behind the front plate without a substantial drain upon its cooling effect by the remainder of the mold. Hence, the time cycle of cooling is shortened considerably over that found in prior art practice.

Heretofore, records have commonly been removed from the press at a temperature of about 100° F. A reasonable temperature differential in the cooling water to accomplish this may be regarded as about 20° F. to 25° F. If the heat transfer is accomplished more directly and without substantial drain upon the cooling water as in the case of our improved mold, the prompt cooling of a hot record can be accomplished with water at temperatures of the order of 75° F. to 80° F. A similar economy may be realized in the steam during the heating cycle, since the heating effect of the steam is confined largely to the region of the front plate of the die holder and the matrix and will not be dissipated to a very great extent into the back plate of the mold.

In accordance with a further feature of our present invention, we have found that it is unnecessary to solder the two plates of the mold to each other but that they may be satisfactorily secured to each other with suitable clamps or cap screws. Notwithstanding the fact that both the steam and the water are supplied at a pressure of approximately 130 lbs. gauge, our improved mold need not necessarily be regarded as a pressure vessel if its exit is open to the atmosphere at all times, and the pressure necessary is more a matter of velocity head required to insure rapid passage of the heating and cooling fluids through the annular passages. Our improved mold need not be structurally as strong as prior art molds in order to continuously withstand the heavy external pressure (usually several thousand pounds per square inch) imposed upon it by the hydraulic ram of the press for the purpose of pressing the record. As a consequence, the two sections or plates of the mold need not be soldered, but there may be interposed between them a very thin sheet of suitable packing material, such as that known commercially as "Vellumoid." This packing, together with the clamping effect of the cap screws, is sufficient to prevent leakage of steam or water at the periphery of the mold. The cap screws may therefore have a slight clearance in the back plate of the mold to permit the two plates of the mold to move slightly with relation to each other because of any difference in temperature therebetween. Thus, distortion and marking of the smooth, outer face of the front plate presented to the matrix is minimized.

The novel features of our invention, as well as additional objects and advantages thereof, will better be understood from the following description of one embodiment thereof, when read in connection with the accompanying drawing, in which the single figure is a central, sectional view through a mold formed in accordance with our present invention.

Referring more particularly to the drawing, there is shown a mold constituted by a relatively thin front plate 1 and a relatively thick back plate 3 assembled in superposed relation and connected together by a plurality of cap screws 5 which are threadedly received in the front plate 1 and which have a slight clearance 7 in the back plate 3. A suitable gasket 9 interposed between the mold plates 1 and 3 provides a fluid-tight connection therebetween. The gasket 9 is preferably of a material which is also a good heat insulator. The material "Vellumoid," which is an asbestos-paper composition manufactured by The Vellumoid Company, Worcester, Mass., is an example of a material which we consider suitable.

Secured to the outer face of the front mold plate 1, as by means of a clamping ring 11, is a suitable die 13, such as a matrix used in pressing phonograph records. The particular form of die or matrix is quite immaterial to the present invention, and any suitable die may be employed with our mold. The back plate 3 is provided with a plurality of relatively deep, concentric, intercommunicating channels 15 which are filled to a substantial height (say, about halfway or more) with a suitable heat insulating material 17, such as rock wool or the like. The material 17 thus covers the bottoms and, to a very substantial height, the side walls of the channels 15. Over each of the layers of insulating material 17 is a sheet or cover 19 of stainless steel or other non-corrosive metal which is firmly secured to the side walls of the channels 15 in fluid-tight relation therewith, as by means of the solder joints 21. Between the face of the front plate 1 (which acts as a cover over the channels 15) and each of the cover sheets 19 there are left passages 23 through which steam and cooling water may be passed alternately for first heating and then cooling the matrix and, in turn, the plastic work material in contact therewith.

From the foregoing description, it will be apparent that, since the steam flowing through the passages 23 is in direct contact with the relatively thin, front plate 1, the heat transfer to the matrix 13 will be effected rapidly and with relatively high efficiency. At the same time, heat flow through the back plate 3 will be very greatly impeded by the layers of insulating material 17 in each of the channels 15. Similarly, when cold water is passed through the passages 23, it can very effectively extract heat from the hot matrix 13 and the front plate 1 by reason of its direct contact with the plate 1, whereas its ability to extract heat from the back plate 3 is greatly impeded by the insulating material 17. Thus, our improved mold not only permits more efficient use of the heating and cooling fluids which flow alternately through the passages 23, but also permits a much shorter cycle, while also permitting the use of water at about room temperature.

Although we have shown and described only a single embodiment of our present invention, it will undoubtedly be apparent to those skilled in the art that many other modifications, as well as variations in that described above, are possible. We therefore desire that the foregoing shall be considered merely as illustrative and not as limiting.

We claim as our invention:

1. A die holder for molds useful in molding plastic articles which comprises a supporting device adapted to receive a die on one surface thereof in heat transfer relation therewith, said device being provided with an internal cavity for the reception, alternately, of heating and cooling fluids, and heat insulating means in the portion of said cavity which is remote from said surface.

2. A die holder for molds useful in molding plastic articles which comprises a supporting device adapted to receive a die on one surface thereof in heat transfer relation therewith, said device being provided with an internal cavity for the reception, alternately, of heating and cooling fluids, heat insulating means covering the portion of said cavity which is remote from said surface, and a cover over said heat insulating member in fluid tight relation with the wall of said cavity.

3. A die holder for molds useful in molding plastic articles which comprises a pair of cooperating plates of heat conductive material, one of said plates being adapted to receive a die on one surface thereof in heat transfer relation therewith, said plates being connected together in interfacial relation with the opposite surface of said one plate in engagement with a surface of the other of said plates, said plates being provided with a channel at their interface for the reception, alternately, of heating and cooling fluids, and heat insulating means in that portion of said channel which is remote from said first named surface.

4. A die holder for molds useful in molding plastic articles which comprises a pair of cooperating plates of heat conductive material, one of said plates being formed with a channel, said plates being connected in opposed, fluid tight relation with one surface of the other of said plates covering said channel to provide a passage for the reception, alternately, of heating and cooling fluids, said other plate being adapted to receive a die on its opposite surface in heat transfer relation therewith, and heat insulating means in said channel for concentrating the heating and cooling effects, respectively, of said heating and cooling fluids in said other plate.

5. A die holder for molds useful in molding plastic articles which comprises a pair of cooperating plates of heat conductive material, one of said plates being formed with a channel, said plates being connected in opposed, fluid tight relation with one surface of the other of said plates covering said channel to provide a passage for the reception, alternately, of heating and cooling fluids, said other plate being adapted to receive a die on its opposite surface in heat transfer relation therewith, heat insulating means in said channel for concentrating the heating and cooling effects, respectively, of said heating and cooling fluids in said other plate, and a cover over said insulating means connected to the walls of said channel in fluid tight relation therewith.

6. A die holder for molds useful in molding plastic articles which comprises a pair of cooperating plates of heat conductive material, one of said plates being formed with a channel, said plates being connected in opposed, fluid tight relation with one surface of the other of said plates covering said channel to provide a passage for the reception, alternately, of heating and cooling fluids, said other plate being adapted to receive a die on its opposite surface in heat transfer relation therewith, and heat insulating means in said channel to a substantial depth therein for concentrating the heating and cooling effects, respectively, of said heating and cooling fluids in said other plate.

7. A die holder for molds useful in molding plastic articles which comprises a pair of cooperating plates of heat conductive material, one of said plates being formed with a channel, said plates being connected in opposed, fluid tight relation with one surface of the other of said plates covering said channel to provide a passage for the reception, alternately, of heating and cooling fluids, said other plate being adapted to receive a die on its opposite surface in heat transfer relation therewith, and heat insulating means in said channel covering the bottom and side walls thereof to a substantial height for concentrating the heating and cooling effects, respecticely, of said heating and cooling fluids in said other plate.

8. A die holder for molds useful in molding plastic articles which comprises a pair of cooperating plates of heat conductive material. one of said plates being formed with a channel, said plates being connected in opposed, fluid tight relation with one surface of the other of said plates covering said channel to provide a passage for the reception, alternately, of heating and cooling fluids, said other plate being adapted to receive a die on its opposite surface in heat transfer relation therewith, heat insulating means in said channel covering the bottom and side walls thereof to a substantial height for concentrating the heating and cooling effects, respectively, of said heating and cooling fluids in said other plate, and a cover over said insulating means connected to the walls of said channel in fluid tight relation therewith.

9. A die holder according to claim 4 characterized in that said other plate is thinner than said one plate.

10. A die holder according to claim 4 characterized in that said plates are yieldably connected to each other for slight lateral shifting movement relative to each other.

THEODORE WACHS.
JAMES M. SHUTT.

REFERENCES CITED

The following references are of record in the file of this patent:

UNITED STATES PATENTS

| Number | Name | Date |
| --- | --- | --- |
| 1,767,062 | Glidden et al. | June 24, 1930 |
| 1,949,275 | Heintz | Feb. 27, 1934 |

FOREIGN PATENTS

| Number | Country | Date |
| --- | --- | --- |
| 306,265 | Great Britain | Feb. 21, 1929 |